United States Patent

Packer

[19]

[11] Patent Number: 6,064,634
[45] Date of Patent: *May 16, 2000

[54] COMPACT DISC PLAYER CAPABLE OF AUTOMATICALLY GENERATING A START COMMAND

[75] Inventor: John S. Packer, San Jose, Calif.

[73] Assignee: STMicroelectronics, N.V., Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/914,296

[22] Filed: Aug. 18, 1997

[51] Int. Cl.$^7$ .................................................. G11B 17/22
[52] U.S. Cl. ................................................................ 369/33
[58] Field of Search ................................. 369/33, 32, 47, 369/48, 54, 58; 386/125, 126

[56] References Cited

U.S. PATENT DOCUMENTS

| | | | |
|---|---|---|---|
| 4,994,925 | 2/1991 | Yamashita et al. | 358/343 |
| 4,996,679 | 2/1991 | Yoshio | 369/33 |
| 5,226,046 | 7/1993 | Hanson | 370/105.4 |
| 5,249,166 | 9/1993 | Hamilton et al. | 369/32 |
| 5,397,853 | 3/1995 | Koguchi | 84/609 |
| 5,508,983 | 4/1996 | Nakamura et al. | 369/32 |
| 5,818,801 | 10/1998 | Watanabe et al. | 369/33 |

OTHER PUBLICATIONS

Denise G. Howe, "Compact Disc Direct Access Storage Disc (CD–DASD)", pp. 1–16, Rev. 1.1, Jan. 25, 1996, Optical Storage Data Center, Tucson, AZ.

Daniel Ewing, "Clickable Imagemap of a CD Player", Rev. ed., 1990, Time–Life Books, Alexandria, VA.

Unknown, "Subcode on the Compact Disk", pp. 1–3, Time–Life Books, 1990, Alexandria, VA.

Prof. Kelin J. Kuhn, "Audio Compact Disk—Writing and Reading the Data", EE 498, pp. 1–9, 1990, Time–Life Books, Alexandria, VA.

Prof. Kelin J. Kuhn, "Audio Compact Disk—An Introduction", EE 498, pp. 1–8, 1990, Time–Life Books, Alexandria, VA.

*Primary Examiner*—Tan Dinh
*Attorney, Agent, or Firm*—Theodore E. Galanthay; Lisa K. Jorgenson; Steven H. Slater

[57] ABSTRACT

Disclosed is a compact disc apparatus having automatic start capabilities. The compact disc apparatus includes a digital signal processor for reading sectors that have a plurality of EFM frames, and the EFM frames contain at least a data component and a subcode component. Also included is a Q-subcode extractor for retrieving a Q-bit from each of the plurality of EFM frames being read by the digital signal processor. An auto-start unit is further included to analyze and process the retrieved Q-bits from each of the plurality of EFM frames, such that a determination is made as to whether a minute/second/frame derived from the retrieved Q-bits matches a desired start minute/second/frame location. Wherein the data being read from sectors by the digital signal processor starts transferring data to a memory beginning with the desired start minute/second/frame when the match is found by the auto-start unit.

31 Claims, 6 Drawing Sheets

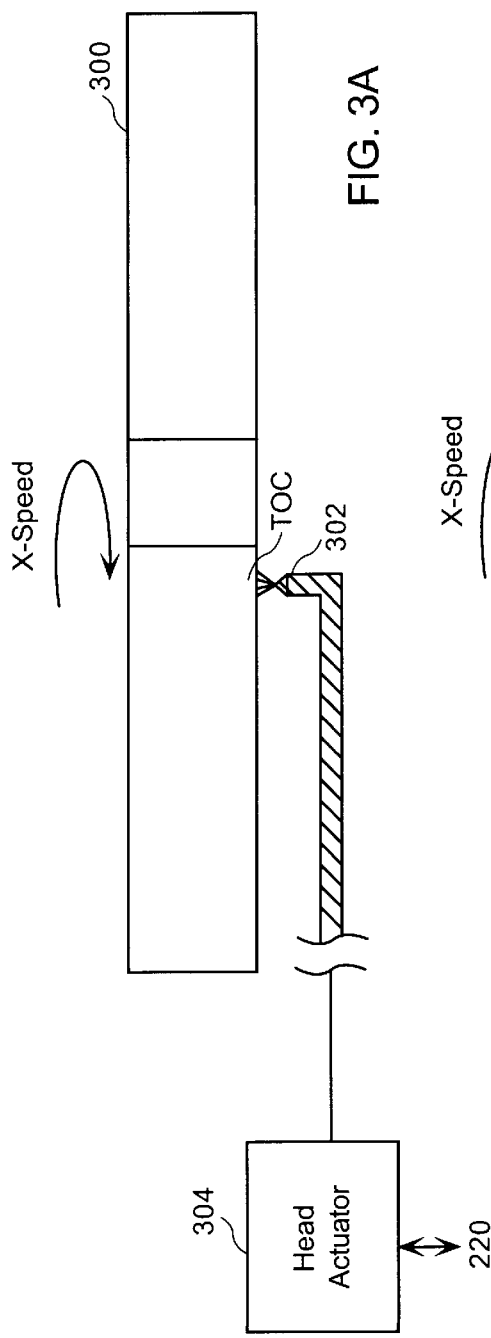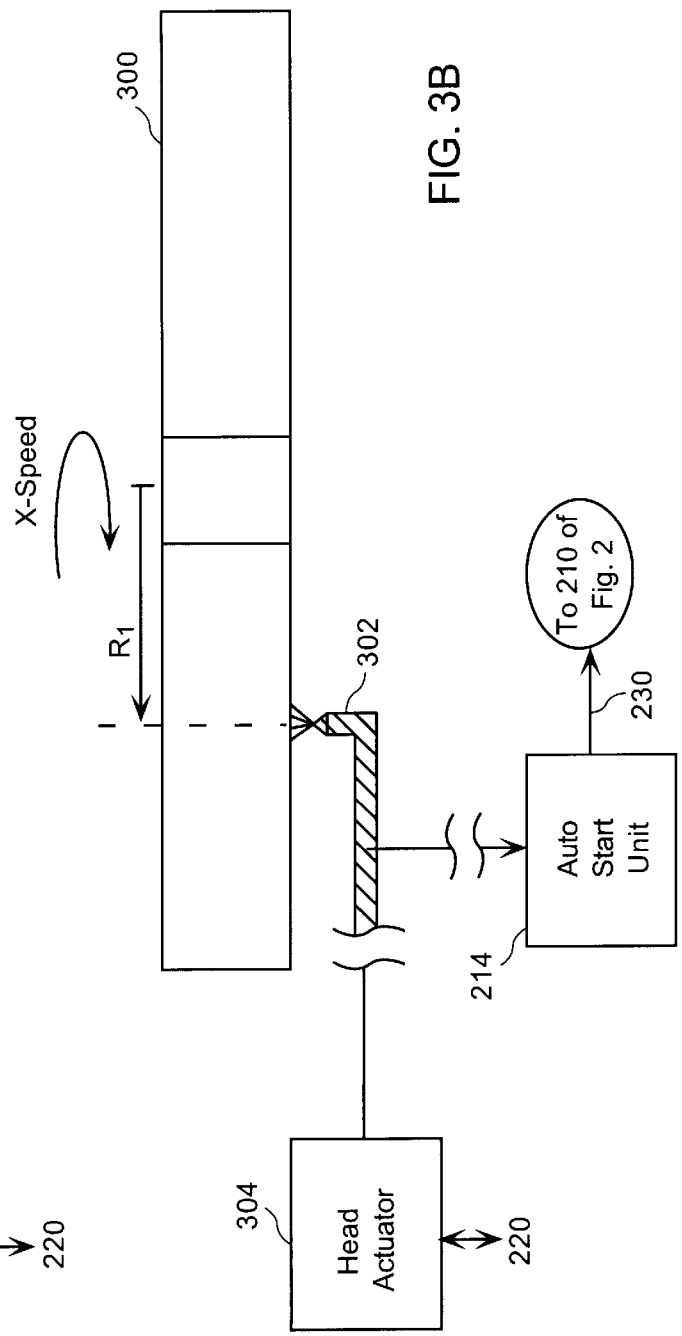

COMPACT DISC PLAYER CAPABLE OF AUTOMATICALLY GENERATING A START COMMAND

CROSS REFERENCE TO RELATED APPLICATIONS

This application is related to the following U.S. patent applications: (1) Ser. No. 08/914,382 filed on the same day as the instant application, and entitled "Methods and Apparatus For Delayed Block Release in Compact Disc Systems", and (2) Ser. No. 08/914,298 filed on the same day as the instant application, and entitled "Method and Apparatus for Subcode/Data Synchronization in a Compact Disc System". These applications are hereby incorporated by reference.

BACKGROUND OF THE INVENTION

1. Field of the Invention

This invention relates generally to compact discs, and more particularly efficient integrated circuit processing in high speed compact disc drives.

2. Description of the Related Art

Compact disc drives have become increasingly popular due to their ability to rapidly access large quantities of data as well as provide fine quality digital play-back. To meet the need for increased data transfer rates, compact disc "CD" hardware engineers have been designing CD drives that are able to transfer data at speeds that are many times the rotational speed of normal audio CD audio (e.g., 4×, 10×, 24×, . . . 50× . . . etc.). For example, when a CD contains normal audio, the processing and play-back of the audio data is performed at 1× speeds. Accordingly, CD drives must be capable of operating at various speeds in order to appropriately process the data contained on a CD media, whether the CD media contains pure audio data or some other type of stored data.

Although there are many types of CD drives that provide different rotational speeds depending on the type of CD media being read, a new type of CD drive, which is capable of maintaining a constant high rotational speed irrespective of what the CD media has stored therein has recently been developed. The various advantages of such CD drives are discussed in greater detail in a co-pending U.S. patent application entitled "An Improved Disc Drive", and having U.S. Ser. No. 08/917,792, which is incorporated by reference herein. Because the CD will now rotate at a constant high speed, the CD drive must be capable of reading and processing the data stored on the CD sufficiently fast to avoid introducing delays.

A common technique for increasing processing speeds has been to incorporate faster microprocessors, however, even fast processors have found reading and processing the CD media being spun at ever increasing speeds a challenge. By way of example, basic CD drive tasks, such as "seeking" to a location on the CD media in order to start play-back, are becoming increasingly difficult. In some cases, the microprocessor that is in charge of seeking to a particular "start" location on a CD media track has been found to be too slow to begin a play-back once the start location has been identified. That is, by the time the microprocessor determines that it has the correct start location, the CD media will have spun past its appropriate starting location. Many times, play-back may not start until a next sector is encountered.

FIGS. 1A through 1C illustrate, by way of background, techniques used to store audio data on a CD media 100. As is well known, the CD media 100 has a continuous track that spirals around the CD media 100, beginning at the inner region and ending at the outer edge. At the beginning of the track, a lead-in region typically contains a table of contents (TOC) that is used by the CD drive to ascertain where data recorded on the CD media 100 is located, in terms of minutes, seconds and frames (i.e., MSFs). As shown, the track of the CD media 100 is divided into many sectors 102, where each sector 102 contains 2352 bytes of data. The final sector 102 of the CD media 100 is then followed by a lead-out region, which signals the end of the CD media 100.

Besides the 2352 bytes of data, 98 bytes of subcode bytes are also included in each sector 102, such that there are 98 bits of P-subcode, 98 bits of Q-subcode, 98 bits of R-subcode, 98 bits of S-subcode, 98 bits of T-subcode, 98 bits of U-subcode, 98 bits of V-subcode, and 98 bits of W-subcode in each sector 102. As is well known, each of these subcode bits may be used for a number of identification purposes, however, only the 98 bits of Q-subcode are used to ascertain the absolute MSF of a particular sector 102. Of course, the Q-subcode is sometimes used for other processing and identification purposes as well.

FIG. 1B provides a closer examination of the typical contents of an audio sector that may be stored on an audio track. For example, each sector 102a–102n will typically contain a pre-gap region 104 that is typically used as a silent region. Each sector 102a–102n also contains 98 "eight-to-fourteen modulation" (EFM) frames 106 that have both audio data and subcode data. As shown in FIG. 1C, each EFM frame 106 typically contains a SYNC field 120, a subcode field 122, a data field 124, an ECC (C1) field 126, a data field 128 and an ECC (C2) field. As described above, a sector 102 has 98 bytes of subcode, and therefore, each EFM frame will contain 8 bits of subcode (i.e., a P-bit, a Q-bit, an R-bit, an S-bit, a T-bit, a U-bit, a V-bit, and a W-bit).

In operation, when a user wants to seek out to a particular MSF on the CD media, a head actuator (not shown) moves an optical reading head to the radial position where the desired data is believed to be located. To identify the location, the optical reading head is required to sequentially read out one Q-bit at a time from a sector 102 until all 98 Q-bits have been read. Once all 98 Q-bits are read, the CD drive must perform microprocessor operations to determine whether those 98 Q-bits define an MSF that is equal to the desired MSF. Once the microprocessor determines that the MSF values match, the CD drive must be quick enough to start a data transfer (i.e., begin reading for play-back).

As mentioned earlier, as disc speeds continue to increase, the microprocessors that are assigned the task of processing the 98 bytes of subcode for each sector 102, will find it challenging, if not impossible, to begin the data transfer before the next sector is encountered. Referring to FIG. 1B, after all 98 bytes of subcode for sector 102a have been read by the CD drive, and the microprocessor performs the necessary operations to determine that sector 102a has the correct MSF it was looking for (i.e., the found MSF), the microprocessor is required to initiate the "start" of a data transfer. However, even the fastest of microprocessors will experience processing latencies 140 and 142 in: (a) finding the correct MSF, and (b) triggering a start after the correct MSF is actually found.

Unfortunately, as disc speeds continue to increase, the pre-gap 104, which defines the time slot in which the microprocessor performs its identification and start processing will consequently decrease. When this happens, the CD drive will typically be unable to start a data transfer within the pre-gap area, and therefore start the data transfer somewhere within the sector, and therefore start inside one of the EFM frames 106. As a result, the CD drive may commence a song somewhere in the middle.

In view of the foregoing, there is a need for a compact disc drive having automatic start capabilities to ensure that a start is rapidly triggered when a seek to a particular MFS is requested.

SUMMARY OF THE INVENTION

Broadly speaking, the present invention fills these needs by providing a method and apparatus for automatically starting a disc transfer once a desired MSF is found by a microprocessor independent state machine. It should be appreciated that the present invention can be implemented in numerous ways, including as a process, an apparatus, a system, a device, a method, or a computer readable medium. Several inventive embodiments of the present invention are described below.

In one embodiment, a method for automatically generating a start command to begin the transfer of data from a compact disc media to a play-back buffer memory in a compact disc drive system is disclosed. The method includes receiving a start minute/second/frame location that is to define a start location on the compact disc media.

Receiving an initiation command from a microprocessor to begin a examination of Q-bit frames such that the examination is carried out without the processing assistance of a microprocessor. When the examination detects a Q-bit frame having a minute/second/frame location that matches the start minute/second/frame location, the start command to begin the transfer of data from the compact disc media to the play-back buffer memory in the compact disc drive system will be initiated.

In another embodiment, a compact disc apparatus having automatic start capabilities is disclosed. The compact disc apparatus includes a digital signal processor for reading sectors that have a plurality of EFM frames, and the EFM frames contain a data component and a subcode component. A Q-subcode extractor for retrieving a Q-bit from each of the plurality of EFM frames being read by the digital signal processor. An auto-start unit that is configured to analyze the retrieved Q-bits from each of the plurality of EFM frames, such that a determination is made as to whether a minute/second/frame derived from the retrieved Q-bits matches a desired start minute/second/frame location. Wherein the data being read from sectors by the digital signal processor starts transferring data to a memory beginning with the desired start minute/second/frame when the match is found by the auto-start unit.

In yet a further embodiment, a compact disc drive having a digital signal processing means for reading sectors on a CD media, wherein the sectors have a plurality of EFM frames, and the EFM frames have a data component and a subcode component, is disclosed. The compact disc drive includes a Q-subcode extracting means for retrieving a Q-bit from each of the plurality of EFM frames being read by the digital signal processing means. An auto-starting means for analyzing the retrieved Q-bits from each of the plurality of EFM frames, such that the auto-starting means determines whether a minute/second/frame that is derived from the retrieved Q-bits matches a desired start minute/second/frame location. Wherein the data being read from sectors by the digital signal processing means starts transferring data to a memory when the match is found by the auto-starting means, and the transferring of data begins with the desired start minute/second/frame location.

Advantageously, as disc speeds continue to increase, the auto-start unit in accordance with the present invention is well suited to rapidly process the Q-subcode in order to automatically start the transfer of data to a buffer memory. Further, the rapid processing performed by the auto-start unit substantially eliminates microprocessor intervention, thereby reducing processor latencies and/or delayed starts. Furthermore, because CD audio speeds are no longer restricted to 1× speeds, the rapid auto-start features of the present invention are well suited to perform the subcode reads, MSF comparisons and start triggering in CD audio systems that operate at substantially increased audio transfer speeds (e.g., 10×, . . . 24×, . . . 50×, . . . N×). It should also be appreciated that these advantages are especially well suited to comply with the "audio stream is valid" requirements. These and other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 3A and 3B are cross sectional views of a compact disc(CD) media that is rotated during a reading from or writing to the CD media in accordance with one embodiment of the present invention.

DETAILED DESCRIPTION OF THE PREFERRED EMBODIMENTS

An invention is described for a method and apparatus for automatically starting a disc transfer once a desired MSF is found by a microprocessor independent state machine. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

Figure 1A:
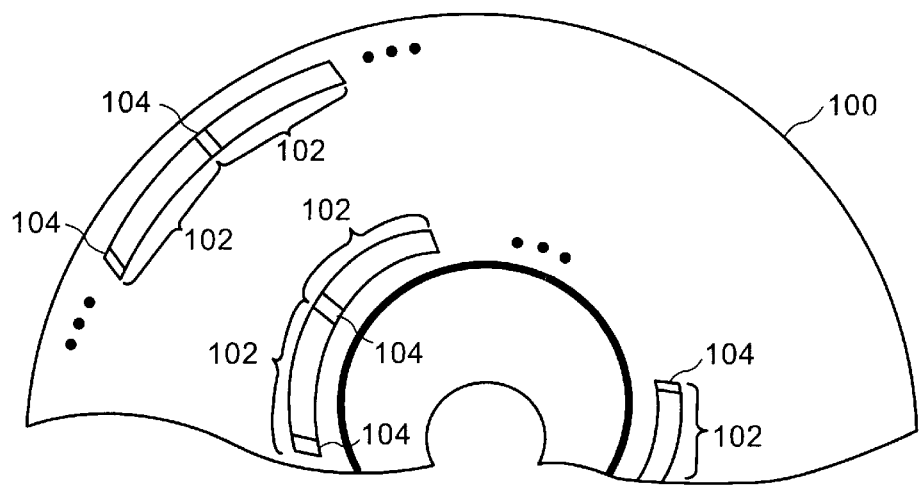
FIGS. 1A through 1C illustrate conventional techniques used to store audio data on a CD media.
Figure 1B:
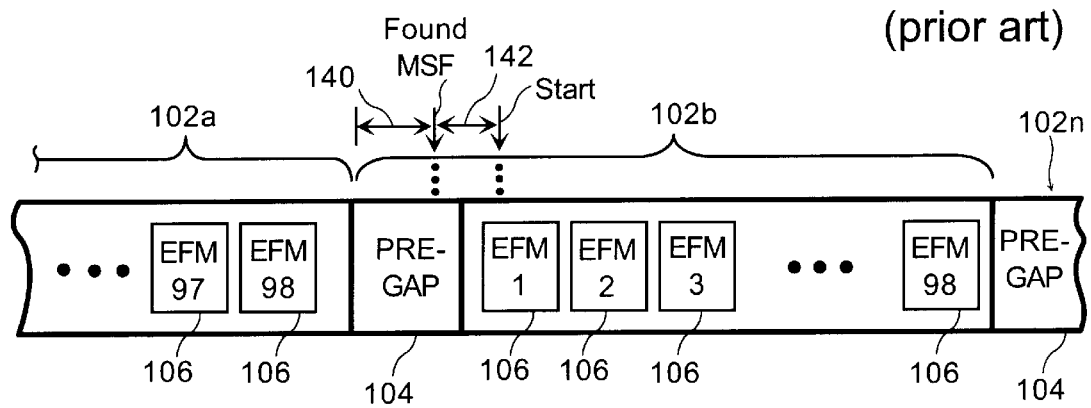
Figure 1C:
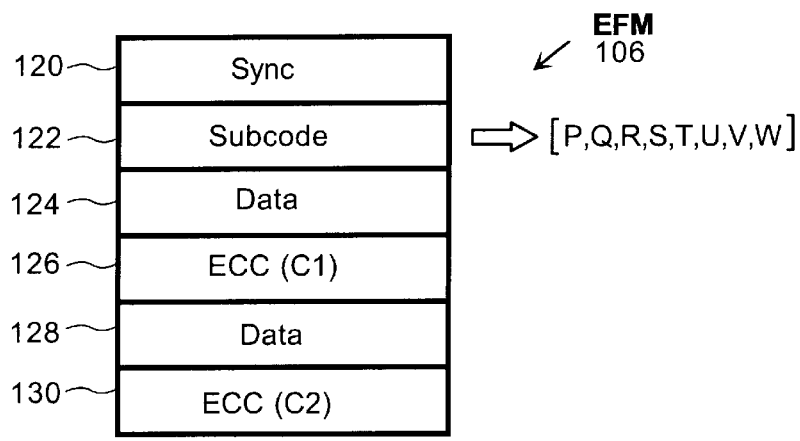
Figure 2:
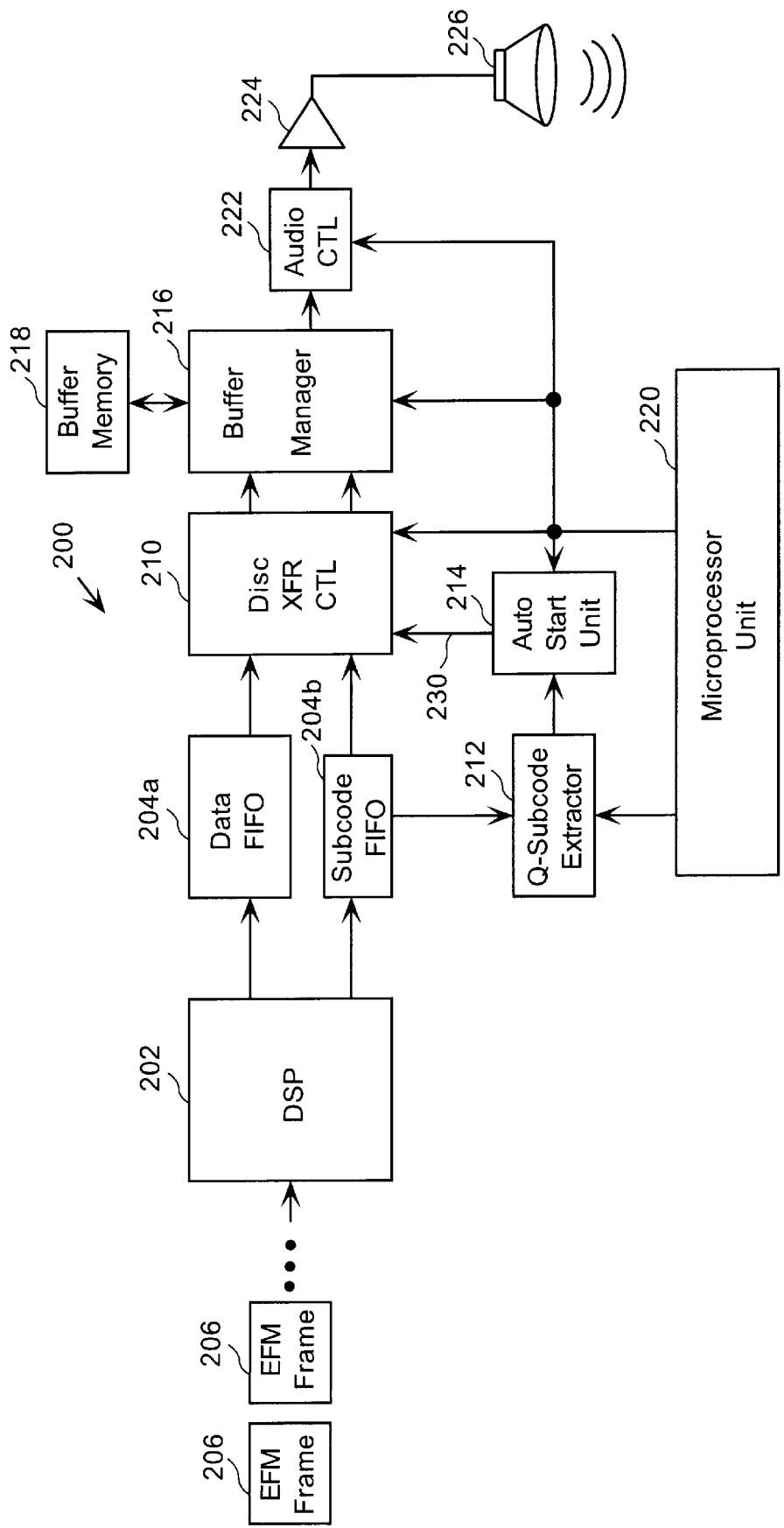
FIG. 2 is a system diagram of the functional blocks contained within a disc drive system in accordance with one embodiment of the present invention.

FIG. 2 is a system diagram of the functional blocks contained within a disc drive system 200 in accordance with one embodiment of the present invention. In operation, a digital signal processor 202 is configured to sequentially receive eight-to-fourteen modulation "EFM" frames 206 in order to process the subcode and data information (e.g., audio sound data) contained within each EFM frame as described with reference to FIG. 1C above. As frames are received by the digital signal processor 202, a separation is performed such that "data" is transferred out to a data first-in-first-out (FIFO) 204a, and subcode is transferred out to a subcode first-in-first-out (FIFO) 204b.

At this point, the subcode will have been separated from the data portion of the EFM frame 206, and therefore, FIFO 204b may contain eight bits of subcode (i.e., P, Q, R, S, T, U, V, and W subcode bits) for each EFM frame 206. In this embodiment, a Q-subcode extractor 212 is preferably implemented to extract the Q-subcode bit from each EFM frame received by the subcode FIFO 204b. In this manner, the subcode extractor 212 will be well suited to feed an auto-start unit 214 each of the "98 Q-bits" associated with a particular sector, that may be in the process of being read from a compact disc (CD) media.

In a preferred embodiment of the present invention, the auto-start unit 214 is a state machine that is configured to accept the Q-bits being extracted from each EFM frame by the DSP 202, and channeled to the subcode FIFO 204b. Accordingly, when the auto-start unit 214 has received each of the 98-Q bits for a particular sector, the auto-start unit will automatically compare a minute/second/frame (MSF) parameter programmed into the 98 Q-bits of the particular sector with a desired MSF that has been requested by a microprocessor unit 220.

By way of example, if a user desires to locate a particular MSF on a CD media, the microprocessor unit 220 will know the exact MSF for that desired location based on a prior reading of a table of contents (TOC) contained in a lead-in region of the CD media. Accordingly, when the auto-start unit 214 identifies a frame (i.e., 98 bits) of Q-subcode that match the user desired MSF location, the auto-start unit 214 will automatically transmit a control signal 230 to a disc transfer controller 210. As shown, the disc transfer controller 210 is configured to receive the data previously partitioned by the DSP 202 and stored in the data FIFO 204a.

Accordingly, when the disc transfer controller 210 receives the control signal 230 from the auto-start unit 214, the data stored in the data FIFO 204a will be transferred to a buffer manager 216. Buffer manager 216 in turn transfers that data to a buffer memory 218, provided the buffer memory has sufficient space to accept the transfer. In one embodiment, the buffer memory 218 may be any suitable storage medium, such as a random access memory (RAM), dynamic random access memory (DRAM), etc. At this point, the disc drive system 200 will be transferring the desired data to the buffer memory 218 from the appropriate user selected MSF, that was detected by the auto-start unit 214. The data transfer will therefore continue until the buffer manager 216 determines that the buffer memory 218 is sufficiently full to enable play-back through an audio controller 222, an amplifier 224, and a speaker 226.

Advantageously, the microprocessor unit 220 is no longer responsible for the core processing tasks of processing the extracted Q-subcode to ascertain whether the MSF of an incoming sector matches the MSF of a desired start location. As such, the state machine of the auto-start unit 214, once loaded with a desired start MSF, is a self contained processing engine that continuously performs operations to determine whether the incoming sector has an MSF that matches a desired MSF. It should therefore be appreciated that the auto-start unit 214 reduces the processing load of microprocessor unit 220, while also enabling much more rapid (i.e., latency reduced) starts when the desired MSF is detected. Consequently, the auto-start unit 214 also enables accurate starts even when the CD media is spinning at high speeds approaching 50× or greater.

The transfer is therefore commenced immediately after the control signal 230 is received from the auto-start unit 214, thereby eliminating any latencies associated with microprocessor 220 computations. Furthermore, because the microprocessor unit 220 is freed from the intensive processing operations associated with detecting a desired MSF and commanding a start of the data transfer, the microprocessor unit 220 is now able to concentrate on less processing intensive control operations for managing the flow of data through the disc drive system 200.

In another embodiment, the buffer manager 216 is configured to determine when the buffer memory 218 has become sufficiently full, and thereby cease the transfer of data by the disc transfer controller 210. However, when the data transfer resumes, it is important that the data transfer commence exactly where it stopped, otherwise, a gap in data may occur (e.g., the audio sound data may play-back with gaps). Accordingly, when the buffer memory 218 is ready to accept data anew, the disc transfer controller 210 must be able to re-start the data transfer exactly where it left off. To accomplish this, the stopping point MSF will be provided to the auto-start unit 214 to enable it to find and commence the data transfer exactly where it had stopped. Thus, the rapid and accurate features of the auto-start unit 214 enable high quality data transfers that substantially prevent noise and gaps associated with improperly resuming a stopped data transfer from a position other than the original stopping MSF position.

FIGS. 3A and 3B are cross sectional views of a compact disc(CD) media 300 that is being rotated during a reading from or writing to the CD media 300 in accordance with one embodiment of the present invention. As shown in FIG. 3A, a head actuator 304 is designed to initially place an optical head 302 near the inner diameter of the CD media 300. In this manner, the optical head 302 will be able to read the TOC that contains all of the MSF locations that are stored on the CD medium 300.

Once the optical head 302 has read the information contained in the TOC, the disc drive system 200 will know the exact MSF location of all data stored in the CD media 300. By way of example, if a user wants to listen to the eighth song in an audio CD, the TOC will have the exact MSF associated with the beginning of that particular eighth song. At this point, the microprocessor unit 220 may command the head actuator 304 to move out to a radial position ($R_1$) that is approximately the radial position of the MSF that identifies the start of the eighth song. Once at appropriate radial position $R_1$, the optical head 302 will begin reading EFM frames 206 that are contained in each of the sectors positioned around the CD media 300 at the radial position $R_1$.

As described above, the auto-start unit 214 will continuously be provided with the Q-subcode bits for each of the incoming EFM frames 206 (i.e., the 98 EFM frames of each sector). Accordingly, when the auto-start unit 214 detects a match between the desired MSF location for the eighth song (i.e., the exemplary desired MSF) and the MSF of a current sector being read, the auto-start unit 214 will rapidly pass the control signal 230 to the disc transfer controller 210 to commence a reading of the eighth song into the buffer memory 218 as described above.

Figure 4:
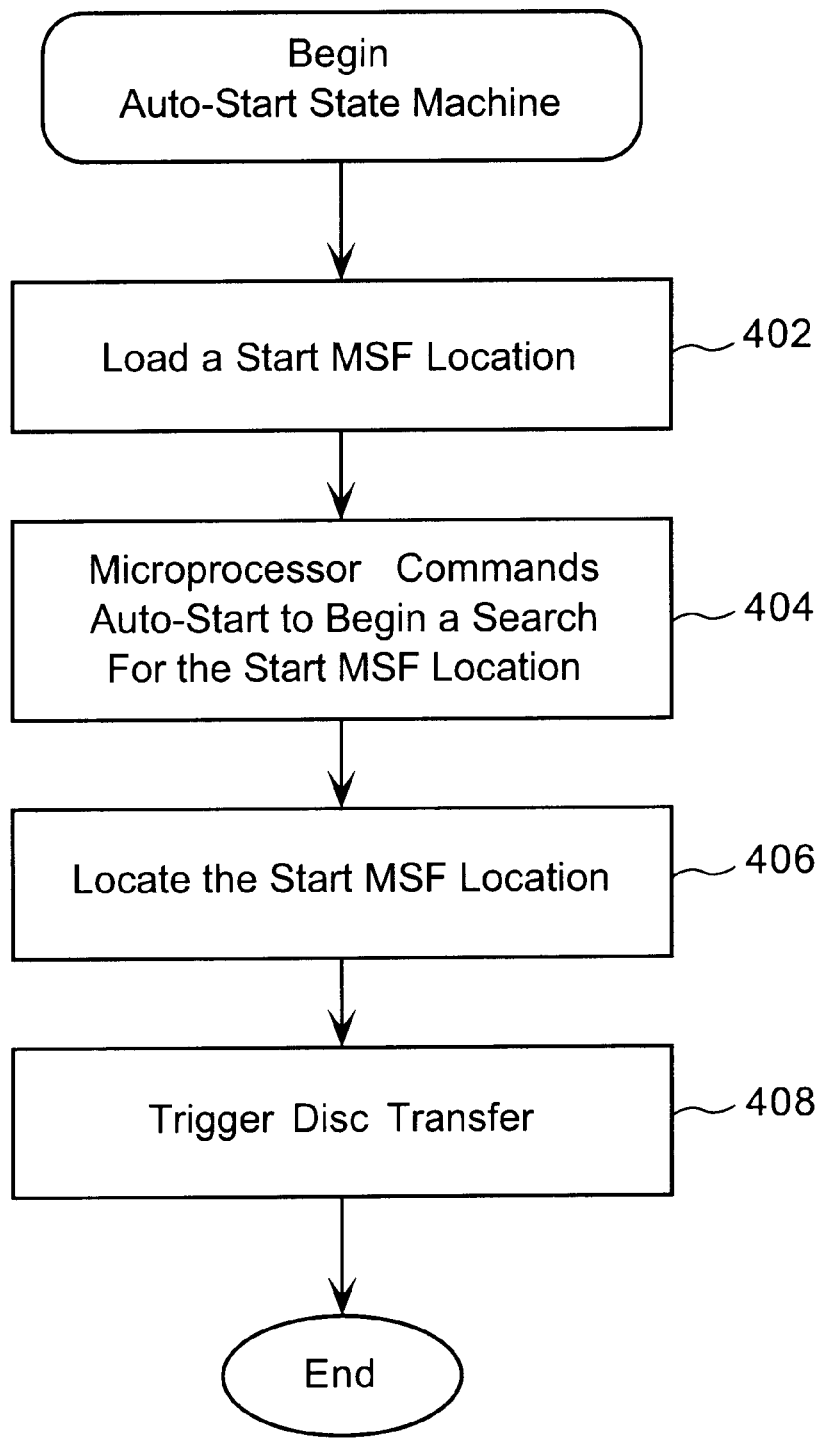
FIG. 4 shows an overview flowchart diagram of the method operations associated with performing an automatic start by the state machine of the auto-start unit in accordance with one embodiment of the present invention.

FIG. 4 shows an overview flowchart diagram of the method operations associated with performing an automatic start by the state machine of the auto-start unit 214 in accordance with one embodiment of the present invention. The method begins at an operation 402 where a start MSF location is loaded into the auto-start unit 214 by the microprocessor unit 220. The start MSF location will preferably an MSF location associated with a particular start point on a CD media, e.g., the point from which playback is desired to commence.

After the start MSF location has been loaded in operation 402, the method will proceed to an operation 404 where the microprocessor commands the auto-start unit 214 to begin a search for the start MSF location. By way of example, once commanded to begin the search, the auto-start unit 214 will constantly compare the start MSF location provided to it by the microprocessor with the MSF associated with a current sector being read by the DSP 202, and extracted by the Q-subcode extractor 212 of FIG. 2. Once the command from the microprocessor has been received by the auto-start unit 214 in operation 404, the method will proceed to an operation 406 where the start MSF location will be located by the auto-start unit 214 after the MSF associated with a particular incoming sector matches the MSF location requested by the user, and provided by the microprocessor to the auto-start unit in operation 404.

Upon locating the start MSF location in operation 406, the method will proceed to an operation 408 where the disc transfer is triggered when the desired start MSF location is located by the auto-start unit 214. Advantageously, once the auto-start unit 214 is provided with the desired start MSF location, the microprocessor need not be involved in processing the incoming Q-subcode to ascertain when a match has been attained. Furthermore, the microprocessor is similarly not required to transmit the start signal to the disc transfer controller 210 of FIG. 2, once the desired start MSF location has been detected. Once the disc transfer has been triggered by the auto-start unit 214 in operation 408, the state machine contained within the auto-start unit 214 will be finished with its processing until it receives a signal from the microprocessor to perform an auto-start at a new desired MSF location.

Figure 5:
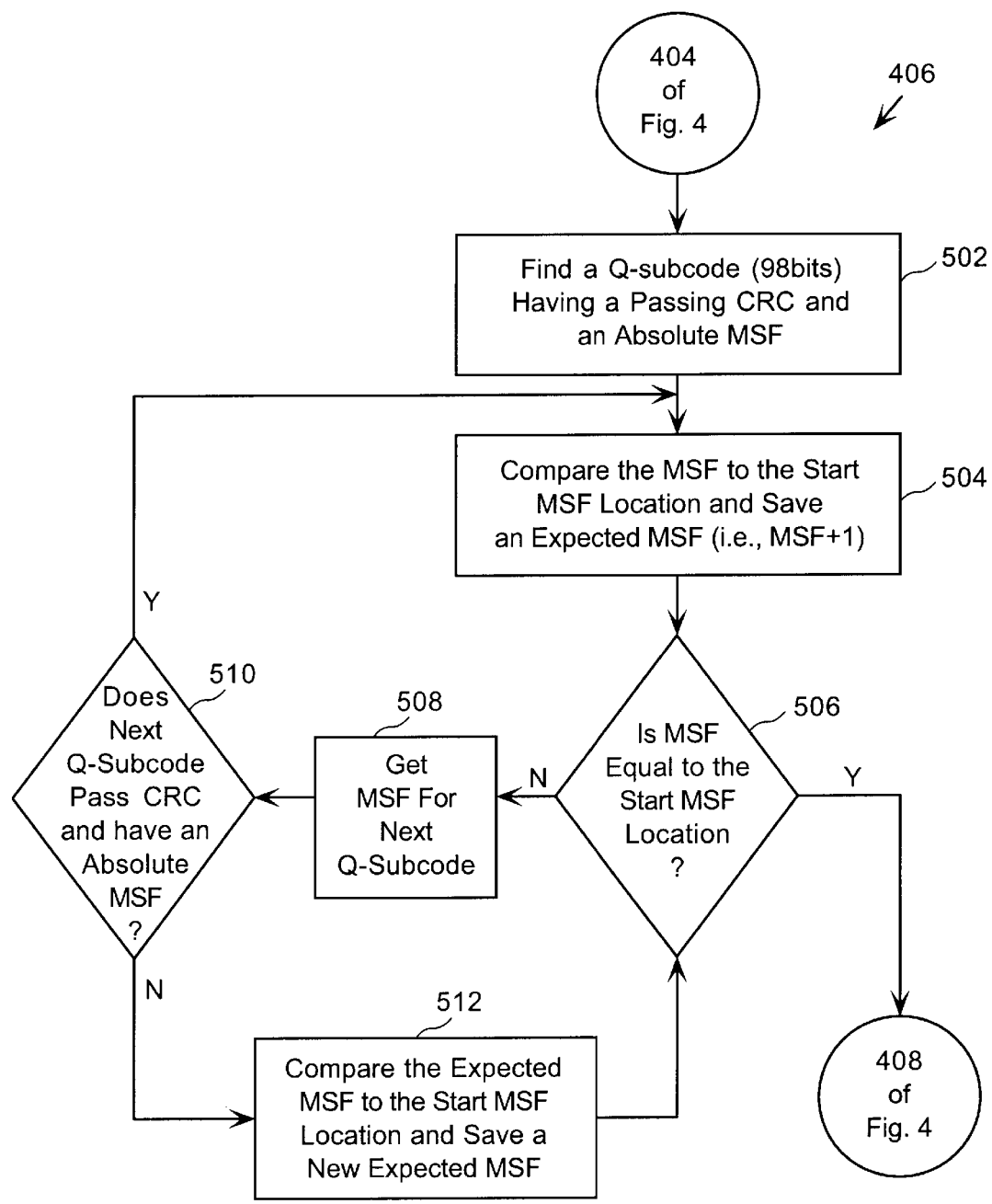
FIG. 5 is a more detailed flowchart diagram of the method operations performed within an operation of FIG. 4 in accordance with one embodiment of the present invention.

FIG. 5 is a more detailed flowchart diagram of the method operations performed within operation 406 of FIG. 4 in accordance with one embodiment of the present invention. The detailed operations of 406 begin at an operation 502 where the auto-start unit 214 finds a Q-subcode that has a passing cyclic redundancy correction (CRC) and an absolute MSF. That is, the 98 bits of Q-subcode that are associated with a current sector must have good integrity (i.e., error free), and have an actual MSF coded in the 98 bits of Q-subcode.

In this embodiment, it is preferred that the Q-subcode found by the auto-start unit 214 contain actual MSF information, as opposed to other types of information, such as catalog numbers and the like, which may sometimes be coded into the Q-subcode of a frame. Therefore, once the Q-subcode having a passing CRC and an absolute MSF has been found in operation 502, the method will proceed to an operation 504 where the MSF found in the current Q-subcode is compared to the start MSF location provided to the auto-start unit 214 by the microprocessor unit 220. At the same time, an expected MSF, that follows the currently found absolute MSF will be stored.

By way of example, the expected MSF (i.e., MSF+1) may be the next MSF that follows the absolute MSF just found. The method then proceeds to a decision operation 506 where it is determined whether the found MSF is equal to the start MSF location. If it is not equal, the method will proceed to an operation 508 where the auto-start unit 214 will get the MSF for the next Q-subcode that is associated with an incoming sector. Once the next Q-subcode of the next sector has been retrieved in operation 508, the method will proceed to a decision operation 510.

In decision operation 510, it is determined whether the next Q-subcode has a passing CRC as well as an absolute MSF. If the conditions of operation 510 are met, the method will proceed back to operation 504 where a compare of the absolute MSF to the start MSF location is performed, and an expected MSF is saved. On the other hand, if the conditions of decision operation 510 are not met, the method will proceed to an operation 512 where the expected MSF is compared to the start MSF location, and a new expected MSF will be saved (i.e., MSF+1+1). The method will then proceed to decision operation 506 where it is again determined whether the MSF is equal to the start MSF location. If it is not, the method will again proceed to operation 508, and then to operation 510. If the next Q-subcode does not pass CRC, or does not contain an absolute MSF, the method will again proceed to operation 512 where the new expected MSF (MSF+1+1) is compared to the desired start MSF location, and another new expected MSF (MSF+1+1+1) is saved. The method will next proceed to the decision operation 506 where it is determined whether the new expected MSF is equal to the start MSF location. If they are equal, the method will proceed to operation 408 of FIG. 4, otherwise, the method will continue until the start MSF location is found.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y may be used to design an appropriate silicon-level layout. Although any suitable design tool may be used, another layout tool may include a hardware description language "Verilog®" tool available from Cadence Design Systems, Inc. of Santa Clara, Calif.

The invention may also employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 6:
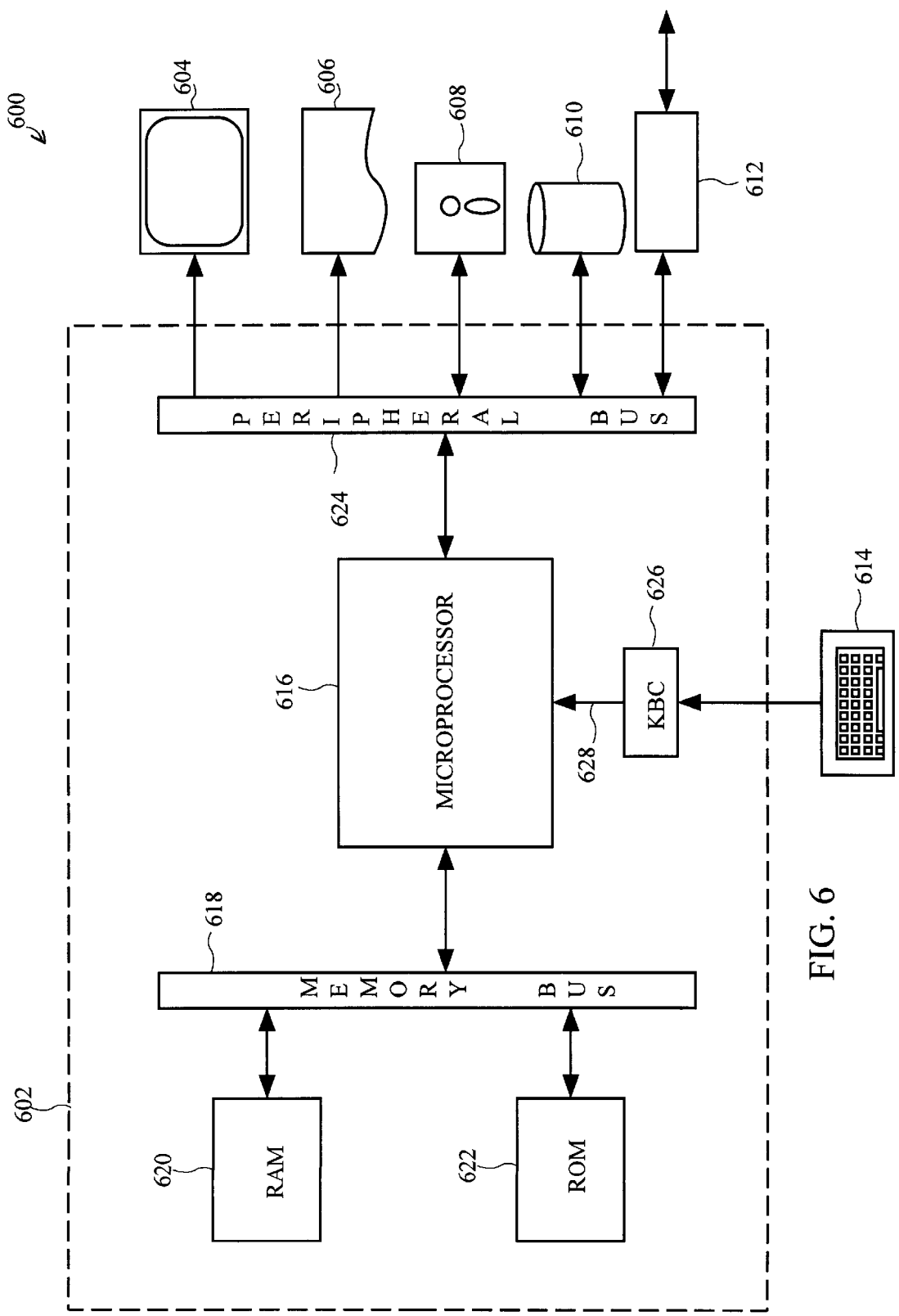
FIG. 6 is a block diagram of an exemplary computer system for carrying out some of the processing according to the invention.

FIG. 6 is a block diagram of an exemplary computer system 600 for carrying out the processing according to the invention. The computer system 600 includes a digital computer 602, a display screen (or monitor) 604, a printer 606, a floppy disk drive 608, a hard disk drive 610, a network interface 612, and a keyboard 614. The digital computer 602 includes a microprocessor 616, a memory bus 618, random access memory (RAM) 620, read only memory (ROM) 622, a peripheral bus 624, and a keyboard controller 626. The digital computer 600 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 616 is a general purpose digital processor which controls the operation of the computer system 600. The microprocessor 616 can be a single-chip processor or can be implemented with multiple components. Using instructions retrieved from memory, the microprocessor 616 controls the reception and manipulation of input data and the output and display of data on output devices. According to the invention, a particular function of microprocessor 616 is to assist in the automatic start state machine processing.

The memory bus 618 is used by the microprocessor 616 to access the RAM 620 and the ROM 622. The RAM 620 is used by the microprocessor 616 as a general storage area and as scratch-pad memory, and can also be used to store input data and processed data. The ROM 622 can be used to store instructions or program code followed by the microprocessor 616 as well as other data.

The peripheral bus 624 is used to access the input, output, and storage devices used by the digital computer 602. In the described embodiment, these devices include the display screen 604, the printer device 606, the floppy disk drive 608, the hard disk drive 610, and the network interface 612. The keyboard controller 626 is used to receive input from keyboard 614 and send decoded symbols for each pressed key to microprocessor 616 over bus 628.

The display screen 604 is an output device that displays images of data provided by the microprocessor 616 via the peripheral bus 624 or provided by other components in the computer system 600. The printer device 606 when operating as a printer provides an image on a sheet of paper or a similar surface. Other output devices such as a plotter, typesetter, etc. can be used in place of, or in addition to, the printer device 606.

The floppy disk drive 608 and the hard disk drive 610 can be used to store various types of data. The floppy disk drive 608 facilitates transporting such data to other computer systems, and hard disk drive 610 permits fast access to large amounts of stored data.

The microprocessor 616 together with an operating system operate to execute computer code and produce and use data. The computer code and data may reside on the RAM 620, the ROM 622, or the hard disk drive 610. The computer code and data could also reside on a removable program medium and loaded or installed onto the computer system 600 when needed. Removable program mediums include, for example, CD-ROM, PC-CARD, floppy disk and magnetic tape.

The network interface 612 is used to send and receive data over a network connected to other computer systems. An interface card or similar device and appropriate software implemented by the microprocessor 616 can be used to connect the computer system 600 to an existing network and transfer data according to standard protocols.

The keyboard 614 is used by a user to input commands and other instructions to the computer system 600. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for automatically generating a start command to begin the transfer of data from a compact disc media to a play-back buffer memory in a compact disc drive system, comprising:

receiving a start minute/second/frame location that is to define a start location on the compact disc media;

receiving an initiation command from a microprocessor to begin a examination of Q-bit frames, the examination being carried out without the processing assistance of a microprocessor, such that when the examination detects a Q-bit frame having a determined minute/second/frame location that matches the start minute/second/frame location, the start command to begin the transfer of data from the compact disc media to the play-back buffer memory in the compact disc drive system will be initiated.

2. A method for automatically generating a start command as recited in claim 1, wherein the start minute/second/frame location is positioned within a pre-gap area of a sector.

3. A method for automatically generating a start command as recited in claim 2, wherein the sector has a plurality of EFM frames, each of the plurality of EFM frames contains a Q-bit subcode, and each of the Q-bit frames contains one of the Q-bit subcodes associated with each of the EFM frames.

4. A method for automatically generating a start command as recited in claim 3, wherein the examination of Q-bit frames includes:

determining whether a current Q-bit frame passes a CRC test; and determining whether the current Q-bit frame defines an absolute minute/second/frame.

5. A method for automatically generating a start command as recited in claim 4, wherein the examination of Q-bit frames further includes:

comparing the absolute minute/second/frame to the start minute/second/frame location; and saving an expected minute/second/frame that sequentially follows the absolute minute/second/frame.

6. A method for automatically generating a start command as recited in claim 5, wherein when the comparing does not produce a match between the determined minute/second/ frame location and the start minute/second/frame location, the method proceeds to get a minute/second/frame of a next Q-bit frame.

7. A method for automatically generating a start command as recited in claim 6, further comprising:
    determining whether the next Q-bit frame has a passing CRC and an absolute minute/second/frame.

8. A method for automatically generating a start command as recited in claim 7, wherein when the next Q-bit frame does not have one of the passing CRC and the absolute minute/second/frame, comparing the saved expected minute/second/frame to the start minute/second/frame location.

9. A method for automatically generating a start command as recited in claim 8, wherein when the start minute/second/frame location matches one of the minute/second/frame of the next Q-bit frame or the expected minute/second/frame, the start command is rapidly communicated to begin the transfer of data without microprocessor intervention.

10. A method for automatically generating a start command as recited in claim 2, wherein the compact disc media contains audio data.

11. A method for automatically generating a start command as recited in claim 2, wherein the compact disc media is a CD-ROM.

12. A method for automatically generating a start command as recited in claim 4, wherein the examination operations are performed on an integrated circuit state machine.

13. A compact disc apparatus having automatic start capabilities, comprising:
    a digital signal processor for reading sectors having a plurality of EFM frames, the EFM frames having a data component and a subcode component;
    a Q-subcode extractor for retrieving a Q-bit from each of the plurality of EFM frames being read by the digital signal processor; and
    an auto-start unit configured to analyze the retrieved Q-bits from each of the plurality of EFM frames, such that a determination is made as to whether a minute/second/frame derived from the retrieved Q-bits matches a desired start minute/second/frame location, such that the data being read from sectors by the digital signal processor starts transferring data to a memory beginning with the desired start minute/second/frame when the match is found by the auto-start unit.

14. A compact disc apparatus having an automatic start capabilities as recited in claim 13, wherein the desired start minute/second/frame location is contained within a pre-gap area of a sector.

15. A compact disc apparatus having an automatic start capabilities as recited in claim 14, further comprising:
    a disc transfer controller that is configured to receive a start control signal from the auto-start unit when the minute/second/frame derived from the retrieved Q-bits matches a desired start minute/second/frame location.

16. A compact disc apparatus having an automatic start capabilities as recited in claim 15, wherein the disc transfer controller receives the data component from a data FIFO and transfers it to the memory upon receiving the start control signal.

17. A compact disc apparatus having an automatic start capabilities as recited in claim 16, further comprising:
    a buffer manager configured to communicate with the memory to determine when the memory reaches a capacity level; and the buffer manager further being configured to cease the transfer of the data component at a re-start pre-gap region when the buffer manager determines that the memory has reached the capacity level.

18. A compact disc apparatus having an automatic start capabilities as recited in claim 17, wherein when the buffer manager determines that the memory is sufficiently available, the auto-start unit further being configured to re-starting the transfer of the data component at the re-start pre-gap region.

19. A compact disc apparatus having an automatic start capabilities as recited in claim 18, wherein the auto-start unit is a state machine that operates to rapidly trigger the start control signal without implementing a microprocessor.

20. A compact disc apparatus having an automatic start capabilities as recited in claim 19, wherein the compact disc apparatus is a computer CD drive.

21. A compact disc drive having a digital signal processing means for reading sectors on a CD media, the sectors having a plurality of EFM frames, and the EFM frames having a data component and a subcode component, comprising:
    a Q-subcode extracting means for retrieving a Q-bit from each of the plurality of EFM frames being read by the digital signal processing means; and
    an auto-starting means for analyzing the retrieved Q-bits from each of the plurality of EFM frames, such that the auto-starting means determines whether a minute/second/frame that is derived from the retrieved Q-bits matches a desired start minute/second/frame location, wherein the data being read from sectors by the digital signal processing means starts transferring data to a memory when the match is found by the auto-starting means, such that the transferring of data begins with the desired start minute/second/frame location.

22. A compact disc drive as recited in claim 21, wherein the desired start minute/second/frame location is contained within a pre-gap area of a sector.

23. A compact disc drive as recited in claim 22, further comprising:
    a disc transfer controller means that is configured to receive a start control signal from the auto-starting means when the minute/second/frame derived from the retrieved Q-bits matches a desired start minute/second/frame location.

24. The method of claim 3 wherein th Q-bit frame to be examined is contained within a first sector and the data to be transferred is contained within a second sector.

25. The method of claim 1 wherein the data is transferred from the compact disc media to a memory.

26. The method of claim 25 wherein the memory is a play-back buffer memory.

27. The compact disc apparatus of claim 13 wherein the plurality of EFM frames are logically organized into sectors and wherein the retrieved Q-bits are contained within a first sector and the data transferred to a memory is contained within a second sector.

28. the compact disc apparatus of claim 13 wherein the plurality of EFM frames are logically organized into sector and wherein the retrieved Q-bits and the data transferred to a memory if cotained within the same sector.

29. The compact disc drive of claim 21 wherein the retrieved Q-bits are contained within a first sector and the data transferred to a memory is contained within a second sector.

30. The compact disc drive of claim 21 wherein the retrieved Q-bits and the data transferred to a memory are contained within the same sector.

31. A method automatically generating a start command to begin the transfer of data from a compact disc media to a play-back buffer memory in a compact disc drive system, comprisin:

receiving a start minute/second/frame location that is to define a start location on the compact disc media;

receiving an initiation command from a microprocessor to begin a examination of Q-bit frames, the examination being carried out without the processing assistance of a microprocessor, such that when the examination detects a Q-bit frame having a determined minute/second/frame location that matches the start minute/second/frame location, the start command to begin the transfer of data from the compact disc media to the play-back buffer memory in the compact disc drive system will be initiated.

* * * * *